(12) United States Patent
Wei

(10) Patent No.: US 8,184,379 B2
(45) Date of Patent: May 22, 2012

(54) ZOOM LENS

(75) Inventor: Lai Wei, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 0 days.

(21) Appl. No.: 13/010,097

(22) Filed: Jan. 20, 2011

(65) Prior Publication Data

US 2011/0205637 A1 Aug. 25, 2011

(30) Foreign Application Priority Data

Feb. 25, 2010 (JP) ................................ 2010-040455

(51) Int. Cl.
G02B 15/14 (2006.01)
(52) U.S. Cl. .......................... 359/691; 359/680; 359/681
(58) Field of Classification Search .................. 359/680, 359/681, 682, 691, 708
See application file for complete search history.

(56) References Cited

U.S. PATENT DOCUMENTS 7,280,284 B2 * 10/2007 Ishii ............................ 359/680
2009/0219626 A1 9/2009 Tomioka

FOREIGN PATENT DOCUMENTS

JP 2005-134887 A 5/2005
JP 2009-230122 A 10/2009

OTHER PUBLICATIONS

U.S. Appl. No. 13/010,100, filed Jan. 20, 2011, Wei.

* cited by examiner

*Primary Examiner* — Jack Dinh
(74) *Attorney, Agent, or Firm* — Foley & Lardner LLP

(57) ABSTRACT

A zoom lens includes sequentially from an object side a first lens group having a negative refractive power; a diaphragm; and a second lens group having a positive refractive power. Zoom from a wide angle edge to a telephoto edge is performed by displacement of the second lens group along an optical axis, toward the object side. Correction of imaging plane variation accompanying zoom, is performed by displacement of the first lens group along the optical axis. The second lens group includes a positive first lens disposed farthest on the object side and having at least one aspheric surface, and a cemented lens that includes a negative lens, a positive lens, and a negative lens. Furthermore, a first condition $\upsilon d_2 p > 75$ is satisfied, $\upsilon d_2 p$ being the Abbe number for a d-line in the positive lens included in the cemented lens of the second lens group.

3 Claims, 9 Drawing Sheets

THIRD EXAMPLE - TELEPHOTO EDGE

ZOOM LENS

CROSS-REFERENCE TO RELATED APPLICATIONS

This application is based upon and claims the benefit of priority from the prior Japanese Patent Application No. 2010-040455, filed on Feb. 25, 2010, the entire contents of which are incorporated herein by reference.

BACKGROUND OF THE INVENTION

1. Field of the Invention

The present invention relates to a zoom lens ideal for video cameras and in particular, surveillance cameras.

2. Description of the Related Art

Conventionally, surveillance cameras, such as those for closed circuit television (CCTV) have been used to monitor unmanned facilities. Surveillance cameras capture images during the day using visible light and at night using near-infrared light. Therefore, a lens system that can be used day or night, i.e., a lens system that can handle both visible and near-infrared light is demanded for surveillance cameras.

Typically, in a lens system designed for the visible light range, chromatic aberration occurs in the near-infrared light range and images captured at night using near-infrared light are out of focus. Thus, a lens system that can correct chromatic aberration over a wide spectrum (from the visible light range to the near-infrared light range) such that the focal points of the spectrum become uniform, is preferable for use in a surveillance camera. A lens that is capable of magnification, is compact, and has a large focal ratio and high optical performance is yet more preferable.

Conventionally, zoom lenses have been proposed that are capable of handling light in the visible range to the near-infrared range and are mountable to a surveillance camera (see, for example, Japanese Patent Application Laid-Open Publication No. 2009-230122). The zoom lens disclosed in Japanese Patent Application Laid-Open Publication No. 2009-230122 includes sequentially from an object side, a first lens group having a negative refractive power, a diaphragm, and a second lens group having a positive refractive power. The first lens group includes sequentially from the object side, a negative meniscus lens, a biconcave lens, and a positive lens. Further, the second lens group includes 5 simple lenses.

Nevertheless, in recent years, in addition to being able to handle wavelengths over a wide spectrum, ranging from the visible light range to the near-infrared light range, a high zoom ratio is also demanded of lens systems for surveillance cameras. Further, high focal ratio lens systems capable of capturing sharp images even in dimly lit places have also come to be demanded. With rapid advances in increasing the pixels of imaging elements (CCD, CMOS, etc.), lens systems capable of capturing even finer details of an object, i.e., megapixel lens systems, have also come to be demanded. In particular, a megapixel lens system for a surveillance camera is demanded that over the entire zoom range, can favorably correct various types of aberration with respect to light in the visible range to the near-infrared range and that further has extremely high optical performance.

However, lens systems for surveillance cameras such as the conventional art disclosed in Japanese Patent Application Laid-Open Publication No. 2009-230122, have, at best, an unsatisfactory zoom ratio on the order of two-fold. Furthermore, the f value of a conventional lens system for a surveillance camera is, at best, on the order of 1.3, again unsatisfactory. Therefore, in attempting to realize a high zoom ratio and a high focal ratio, a significant problem arises in that achieving high optical performance on the megapixel level is difficult with conventional arts.

To solve the problems associated with the conventional arts above, an object of the present invention is to provide megapixel zoom lens that over the entire zoom range, can favorably correct various types of aberration occurring with light in the visible range to the near-infrared range, and that has a high zoom ratio and a high focal ratio.

SUMMARY OF THE INVENTION

It is an object of the present invention to at least solve the above problems in the conventional technologies.

A zoom lens according to one aspect of the present invention includes sequentially from an object side a first lens group having a negative refractive power; a diaphragm; and a second lens group having a positive refractive power. Zoom from a wide angle edge to a telephoto edge is performed by displacement of the second lens group along an optical axis, toward the object side. Correction of imaging plane variation accompanying zoom, is performed by displacement of the first lens group along the optical axis. The second lens group includes a positive first lens disposed farthest on the object side and having at least one aspheric surface, and a cemented lens that includes a negative lens, a positive lens, and a negative lens. Furthermore, a first condition $\upsilon d_2 p > 75$ is satisfied, $\upsilon d_2 p$ being the Abbe number for a d-line in the positive lens included in the cemented lens of the second lens group.

The other objects, features, and advantages of the present invention are specifically set forth in or will become apparent from the following detailed description of the invention when read in conjunction with the accompanying drawings.

DETAILED DESCRIPTION OF THE PREFERRED EMBODIMENTS

Figure 1:
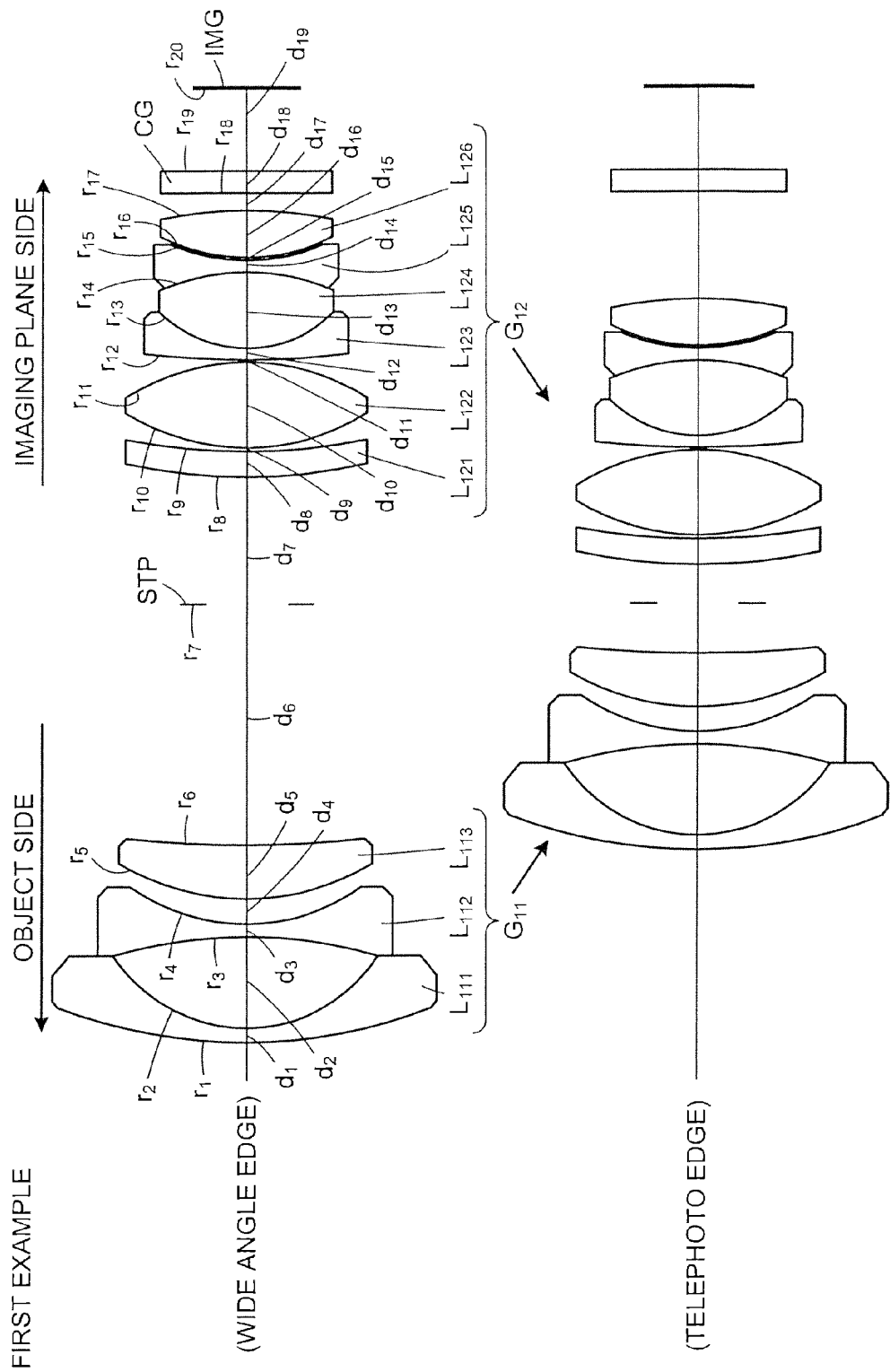
FIG. 1 depicts a cross-sectional view (along an optical axis) of a zoom lens according to a first example.

Referring to the accompanying drawings, exemplary embodiments according to the present invention are explained in detail below.

A zoom lens according to an embodiment includes sequentially from an object side, a first lens group having a negative refractive power, a diaphragm, and a second lens group having a positive refractive power. The zoom lens zooms from a wide angle edge to a telephoto edge by moving the second lens group along an optical axis, toward the object side; and corrects imaging plane (image location) variations accompanying zoom, by moving the first lens group along the optical axis.

An object of the present invention is to provide a megapixel zoom lens that over the entire zoom range, can favorably correct various types of aberration occurring with light in the visible range to the near-infrared range, and that has a high zoom ratio and a high focal ratio. Therefore, to achieve this object, various conditions are set as indicated below.

The second lens group includes a positive first lens disposed farthest on the object side and having at least one aspheric surface, and a cemented lens including 3 lenses: a negative lens, a positive lens, and a negative lens. By forming an aspheric surface on the first lens disposed farthest on the object side in the second lens group, spherical aberration occurring with a higher zoom ratio and higher focal ratio can be favorably corrected.

In addition, the following conditional expression is preferably satisfied, where $\upsilon d_2 p$ is the Abbe number for the d-line in the positive lens of the cemented lens in the second lens group.

$$\upsilon d_2 p > 75 \quad (1)$$

Conditional expression (1) prescribes a condition to favorably correct, over the entire zoom range, chromatic aberration occurring with light in the visible range to the near-infrared range. By including the negative lens among the 3 lenses forming the cemented lens, there is no refraction of a strong light ray, whereby the occurrence of aberration is suppressed and favorable chromatic aberration correction is realized. Further, use of a low-dispersion material satisfying conditional expression (1) to form the positive lens of the cemented lens, enables chromatic aberration occurring with light in the visible range to the near-infrared range to be favorably corrected over the entire zoom range. Below the lower limit of conditional expression (1), axial chromatic aberration becomes difficult to correct, whereby chromatic aberration occurring with light in the visible range to the near-infrared range cannot be favorably corrected.

Further, in the zoom lens according to the embodiment, the following conditional expression is preferably satisfied, where $\upsilon d_{21}$ is the Abbe number for the d-line in the first lens of the second lens group.

$$\upsilon d_{21} > 63 \quad (2)$$

Similar to conditional expression (1), conditional expression (2) also prescribes a condition to favorably correct, over the entire zoom range, chromatic aberration occurring with light in the visible range to the near-infrared range. Use of a low-dispersion material satisfying conditional expression (2) to form the first lens of the second lens group, enables chromatic aberration occurring with light in the visible range to the near-infrared range to be even more favorably corrected over the entire zoom range.

Furthermore, in the zoom lens according to the embodiment, the first lens group includes sequentially from the object side, 3 lenses constituting 3 groups, including a first lens that is a negative meniscus lens having a convex surface facing toward the object side, a second lens that is a negative biconcave lens, and a positive third lens. Thus, farthest on the object side of the optical system, a negative meniscus lens having a convex surface facing toward the object side can be disposed, which advantageous in increasing the field of view.

In addition, the following conditional expression is preferably satisfied, where $\upsilon d_n$ is the Abbe number for the d-line in the third lens of the first lens group.

$$\upsilon d_{13} < 20 \quad (3)$$

Conditional expression (3) prescribes a condition that enables chromatic aberration occurring in the first lens group to be corrected by the first lens group. In other words, by satisfying conditional expression (3), the third lens, which is a positive lens, causes aberration of the same magnitude and in the opposite direction of the axial chromatic aberration and chromatic difference of magnification caused by the negative lens, whereby the first lens group is able to correct chromatic aberration that occurs. Above the upper limit of conditional expression (3), chromatic aberration of a magnitude necessary for correction cannot occur at the third lens, whereby chromatic aberration occurring in the first lens group increases.

As described, the zoom lens according to the embodiment, by satisfying the conditional expressions above, is able to correct extremely favorably, over the entire zoom range, various types of aberration occurring with light in the visible range to the near-infrared range. Therefore, the lens is ideal for video cameras, such as surveillance cameras, for which high zoom ratios, high focal ratios, and megapixelation are demanded. By simultaneously satisfying plural conditional expressions, even better optical performance can be achieved, i.e., surpassing that when only conditional expression is satisfied.

FIG. 1 depicts a cross-sectional view (along the optical axis) of the zoom lens according to a first example. The zoom lens includes sequentially from an object (non-depicted) side, a first lens group $G_{11}$ having a negative refractive power, a diaphragm STP, and a second lens group $G_{12}$ having a positive refractive power. Between the second lens group $G_{12}$ and an imaging plane IMG, a cover glass CG of an imaging element is disposed. The cover glass CG is disposed as needed and may be omitted when not necessary. Further, at the imaging plane IMG, the light receiving surface of the imaging element, e.g., CCD and CMOS, is disposed.

The first lens group $G_{11}$ includes sequentially from the object side, a first lens $L_{111}$, a second lens $L_{112}$, and third lens $L_{113}$. The first lens $L_{111}$ is a negative meniscus lens having a convex surface facing toward the object side. The second lens $L_{112}$ is a negative biconcave lens. The third lens $L_{113}$ is a positive lens.

The second lens group $G_{12}$ includes sequentially from the object side, a first lens $L_{121}$, a second lens $L_{122}$, a third lens $L_{123}$, a fourth lens $L_{124}$, a fifth lens $L_{125}$, and a sixth lens $L_{126}$. The first lens $L_{121}$ is a positive lens, both surfaces of which are aspheric. The second lens $L_{122}$ is a positive lens. The third lens $L_{123}$ is a negative lens. The fourth lens $L_{124}$ is a positive lens. The fifth lens $L_{125}$ is a negative lens. The third lens $L_{123}$, the fourth lens $L_{124}$, and the fifth lens $L_{125}$ are cemented. Furthermore, the sixth lens $L_{126}$ is a positive lens.

The zoom lens zooms from a wide angle edge to a telephoto edge by moving the second lens group $G_{12}$ along the optical axis, toward the object side; and corrects imaging plane (image location) variations accompanying zoom, by moving the first lens group $G_{11}$ along the optical axis.

Various values related to the zoom lens according to the first example are indicated below.

---

Focal length of entire zoom lens = 2.92 mm (wide angle edge) to 7.70 mm (telephoto edge)
F number = 1.25 (wide angle edge) to 2.03 (telephoto edge)
Angle of view (2ω) = 130.8° (wide angle edge) to 44.8° (telephoto edge)
Zoom ratio = 2.637
(Values related to conditional expression (1))

Abbe number for d-line in positive lens (fourth lens $L_{124}$) in second lens group $G_{12}$ ($\upsilon d_2 p$) = 81.54
(Values related to conditional expression (2))

Abbe number for d-line in first lens $L_{121}$ in second lens group $G_{12}$ ($\upsilon d_{21}$) = 71.68
(Values related to conditional expression (3))

Abbe number for d-line in third lens $L_{113}$ in first lens group $G_{11}$ ($\upsilon d_{13}$) = 17.98

---

| | | | |
|---|---|---|---|
| $r_1$ = 38.6248 | $d_1$ = 0.90 | $nd_1$ = 1.91082 | $\upsilon d_1$ = 35.25 |
| $r_2$ = 9.5823 | $d_2$ = 4.99 | | |
| $r_3$ = −33.4291 | $d_3$ = 0.70 | $nd_2$ = 1.77250 | $\upsilon d_2$ = 49.60 |
| $r_4$ = 12.6912 | $d_4$ = 1.37 | | |
| $r_5$ = 16.8856 | $d_5$ = 3.00 | $nd_3$ = 1.94594 | $\upsilon d_3$ = 17.98 |
| $r_6$ = 94.9793 | $d_6$ = 22.89 (wide angle edge) to 5.89 (telephoto edge) | | |
| $r_7$ = ∞ (aperture stop) | $d_7$ = 7.80 (wide angle edge) to 1.20 (telephoto edge) | | |
| $r_8$ = 19.2702 (aspheric surface) | $d_8$ = 1.50 | $nd_4$ = 1.54332 | $\upsilon d_4$ = 71.68 |
| $r_9$ = 66.7446 (aspheric surface) | $d_9$ = 0.10 | | |
| $r_{10}$ = 13.2994 | $d_{10}$ = 4.60 | $nd_5$ = 1.49700 | $\upsilon d_5$ = 81.54 |
| $r_{11}$ = −14.8634 | $d_{11}$ = 0.10 | | |
| $r_{12}$ = 60.7116 | $d_{12}$ = 0.70 | $nd_6$ = 1.58144 | $\upsilon d_6$ = 40.75 |
| $r_{13}$ = 7.5000 | $d_{13}$ = 4.30 | $nd_7$ = 1.49700 | $\upsilon d_7$ = 81.54 |
| $r_{14}$ = −17.0002 | $d_{14}$ = 0.60 | $nd_8$ = 1.60342 | $\upsilon d_8$ = 38.03 |
| $r_{15}$ = 9.6704 | $d_{15}$ = 0.51 | | |
| $r_{16}$ = 17.9393 | $d_{16}$ = 2.45 | $nd_9$ = 1.77250 | $\upsilon d_9$ = 49.60 |
| $r_{17}$ = −23.7755 | $d_{17}$ = 1.00 (wide angle edge) to 7.60 (telephoto edge) | | |
| $r_{18}$ = ∞ | $d_{18}$ = 1.50 | $nd_{10}$ = 1.51633 | $\upsilon d_{10}$ = 64.14 |
| $r_{19}$ = ∞ | $d_{19}$ = 6.49 | | |
| $r_{20}$ = ∞ (imaging plane) | | | |

---

Constant of cone (κ) and Aspheric coefficients (A, B, C, D)

(Eighth plane)

κ = 1.66135,
A = −2.17920 × $10^{-5}$, B = −3.27663 × $10^{-6}$,
C = −1.00850 × $10^{-7}$, D = 1.16228 × $10^{-9}$ (Ninth plane)

κ = 18.76816,
A = 2.21277 × $10^{-4}$, B = −1.69536 × $10^{-6}$,
C = −1.22002 × $10^{-7}$, D = 1.80346 × $10^{-9}$

---

Figure 2:
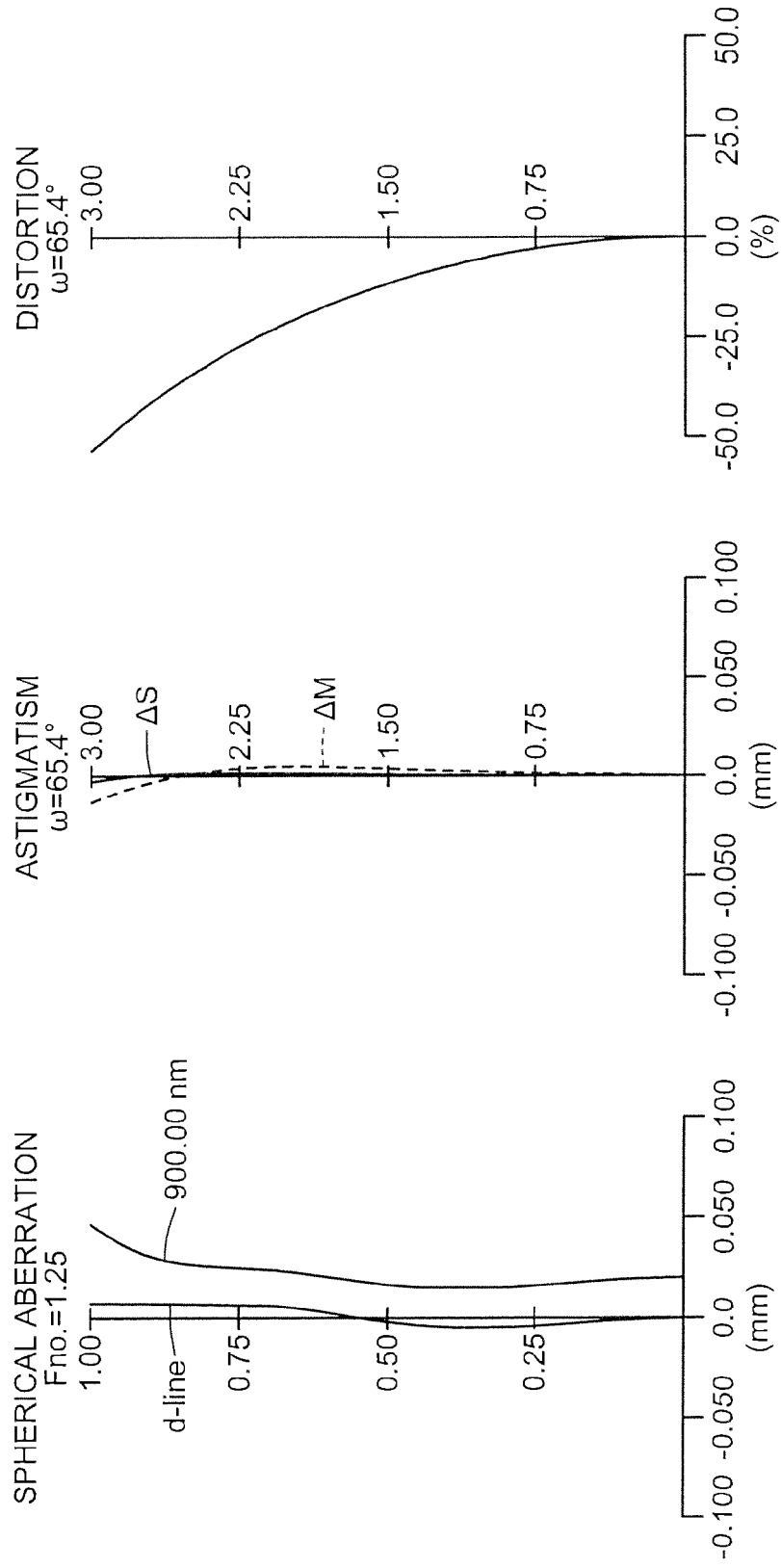
FIG. 2 is a diagram of various types of aberration at a wide angle edge of the zoom lens according to the first example.
Figure 3:
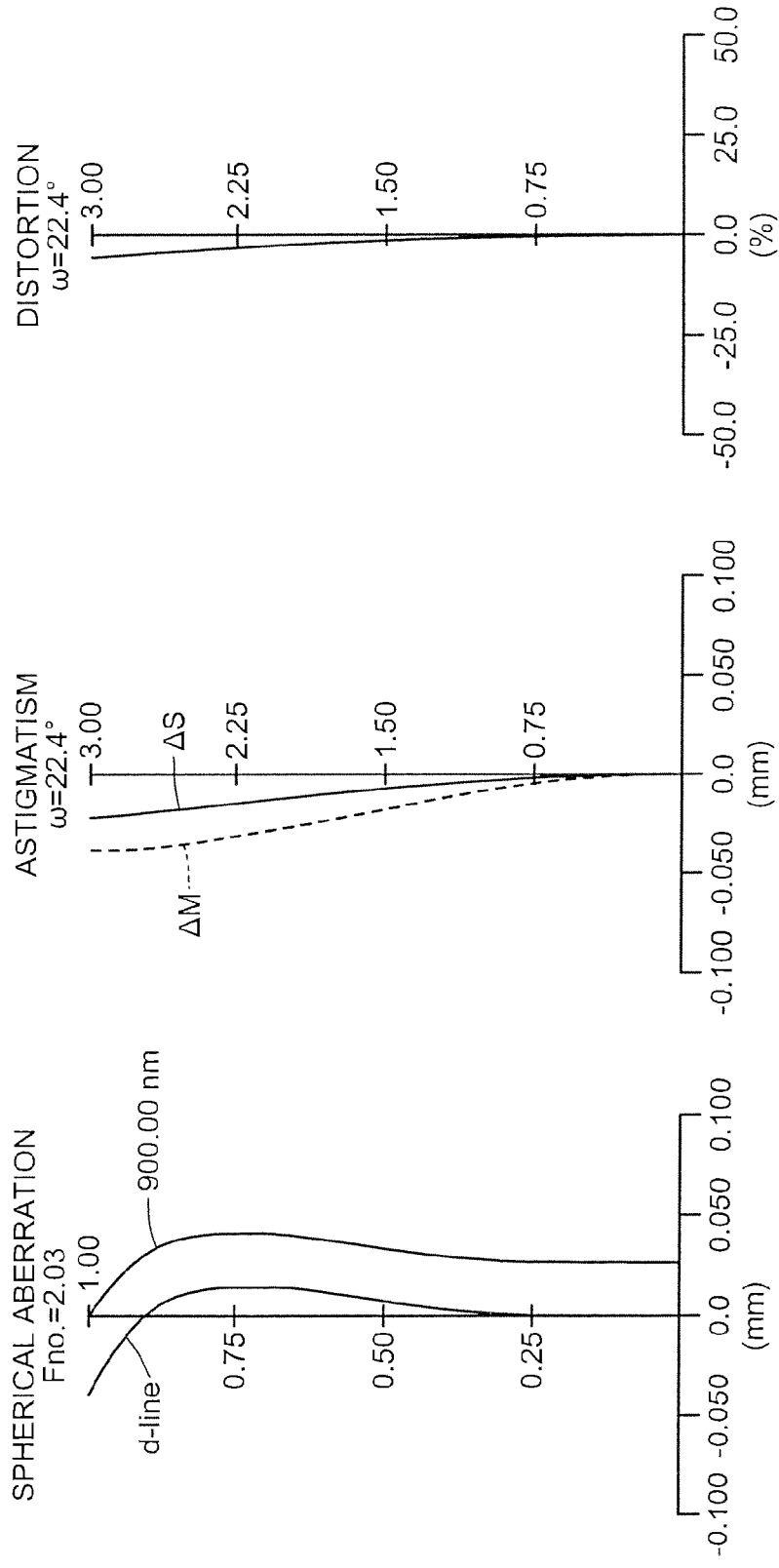
FIG. 3 is a diagram of various types of aberration at a telephoto edge of the zoom lens according to the first example.

FIG. 2 is a diagram of various types of aberration at the wide angle edge of the zoom lens according to the first example; FIG. 3 is a diagram of various types of aberration at the telephoto edge of the zoom lens according to the first example. In the diagrams, d-line indicates aberration for a wavelength equivalent to 587.56 nm; and ΔS and ΔM in a portion depicting astigmatism, indicate aberration with respect to a sagittal image plane and a meridional image plane, respectively.

Figure 4:
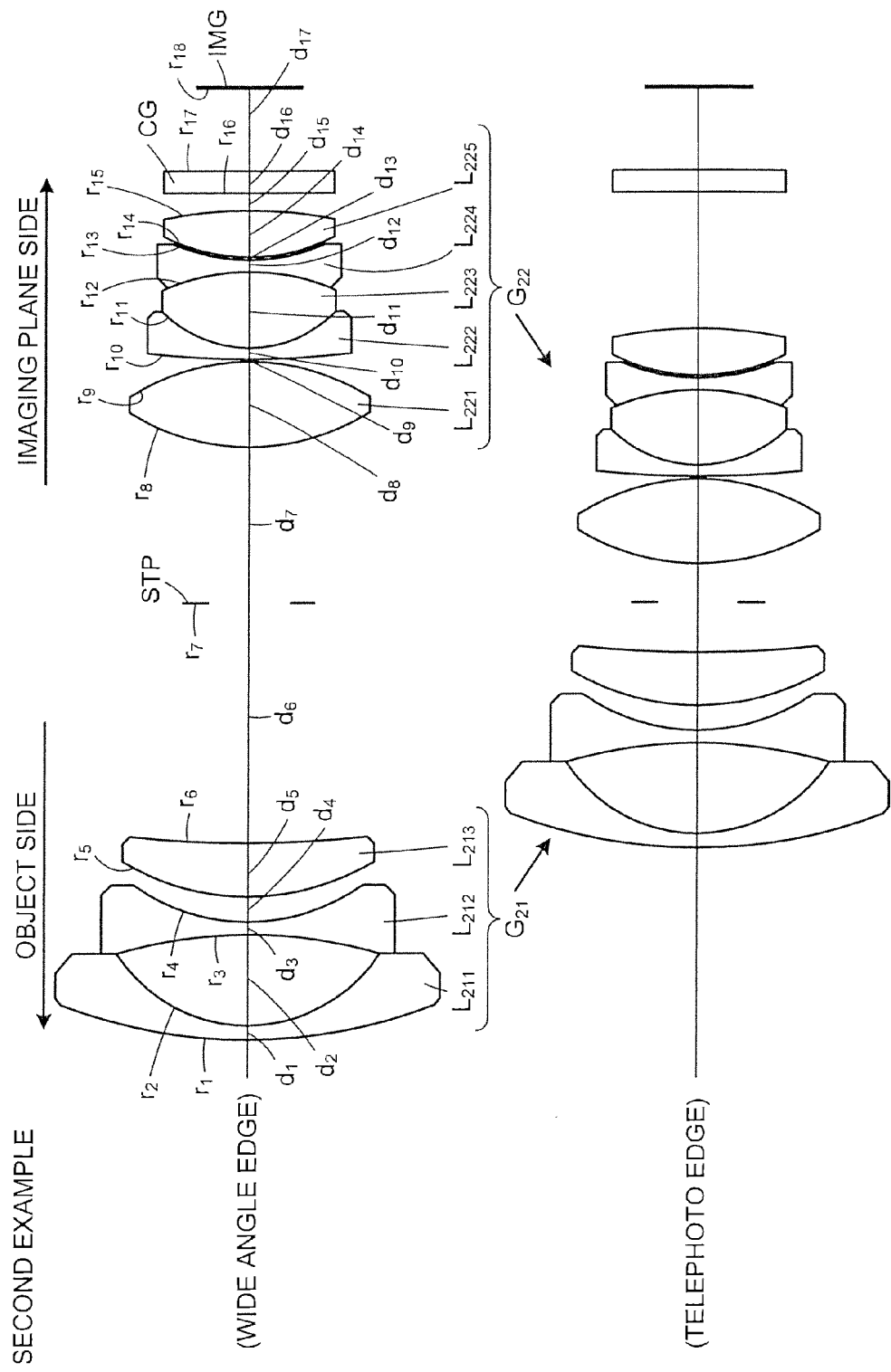
FIG. 4 depicts a cross-sectional view (along the optical axis) of the zoom lens according to a second example.

FIG. 4 depicts a cross-sectional view (along the optical axis) of the zoom lens according to a second example. The zoom lens includes sequentially from the object (non-depicted) side, a first lens group $G_{21}$ having a negative refractive power, a diaphragm STP, and a second lens group $G_{22}$ having a positive refractive power. Between the second lens group $G_{22}$ and the imaging plane IMG, a cover glass CG of an imaging element is disposed. The cover glass CG is disposed as needed and may be omitted when not necessary. Further, at the imaging plane IMG, the light receiving surface of the imaging element, e.g., CCD and CMOS, is disposed.

The first lens group $G_{21}$ includes sequentially from the object side, a first lens $L_{211}$, a second lens $L_{212}$, and a third lens $L_{213}$. The first lens $L_{211}$ is a negative meniscus lens having a convex surface facing toward the object side. The second lens $L_{212}$ is a negative biconcave lens. The third lens $L_{213}$ is a positive lens.

The second lens group $G_{22}$ includes sequentially from the object side, a first lens $L_{221}$, a second lens $L_{222}$, a third lens $L_{223}$, a fourth lens $L_{224}$, and a fifth lens $L_{225}$. The first lens $L_{221}$ is a positive lens, both surfaces of which are aspheric. The second lens $L_{222}$ is negative lens. The third lens $L_{223}$ is a positive lens. The fourth lens $L_{224}$ is negative lens. The second lens $L_{222}$, the third lens $L_{223}$, and the fourth lens $L_{224}$ are cemented. Furthermore, the fifth lens $L_{225}$ is a positive lens.

The zoom lens zooms from a wide angle edge to a telephoto edge by moving the second lens group $G_{22}$ along the optical axis, toward the object side; and corrects imaging plane (image location) variations accompanying zoom, by moving the first lens group $G_{21}$ along the optical axis.

Various values related to the zoom lens according to the second example are indicated below.

---

Focal length of entire zoom lens = 2.92 mm (wide angle edge) to 7.70 mm (telephoto edge)
F number = 1.25 (wide angle edge) to 2.05 (telephoto edge)
Angle of view (2ω) = 131.3° (wide angle edge) to 44.8° (telephoto edge)
Zoom ratio = 2.637
(Values related to conditional expression (1))

Abbe number for d-line in positive lens (third lens $L_{223}$) in second lens group $G_{22}$ ($\upsilon d_2 p$) = 81.54
(Values related to conditional expression (2))

Abbe number for d-line in first lens $L_{221}$ in second lens group $G_{22}$ ($\upsilon d_{21}$) = 81.56
(Values related to conditional expression (3))

Abbe number for d-line in third lens $L_{213}$ in first lens group $G_{21}$ ($\upsilon d_{13}$) = 17.98

---

| | | | |
|---|---|---|---|
| $r_1$ = 41.2584 | $d_1$ = 0.90 | $nd_1$ = 1.91082 | $\upsilon d_1$ = 35.25 |
| $r_2$ = 9.4522 | $d_2$ = 5.05 | | |
| $r_3$ = −32.0885 | $d_3$ = 0.70 | $nd_2$ = 1.72916 | $\upsilon d_2$ = 54.67 |
| $r_4$ = 12.6006 | $d_4$ = 1.30 | | |
| $r_5$ = 16.4048 | $d_5$ = 3.00 | $nd_3$ = 1.94594 | $\upsilon d_3$ = 17.98 |
| $r_6$ = 70.8620 | $d_6$ = 23.80 (wide angle edge) to 6.95 (telephoto edge) | | |
| $r_7$ = ∞ (aperture stop) | $d_7$ = 8.23 (wide angle edge) to 1.20 (telephoto edge) | | |
| $r_8$ = 9.4847 (aspheric surface) | $d_8$ = 4.60 | $nd_4$ = 1.49710 | $\upsilon d_4$ = 81.56 |
| $r_9$ = −19.1651 (aspheric surface) | $d_9$ = 0.10 | | |

-continued

| | | | |
|---|---|---|---|
| $r_{10} = 23.5095$ | $d_{10} = 0.70$ | $nd_5 = 1.56732$ | $\upsilon d_5 = 42.84$ |
| $r_{11} = 7.5000$ | $d_{11} = 4.15$ | $nd_6 = 1.49700$ | $\upsilon d_6 = 81.54$ |
| $r_{12} = -32.7223$ | $d_{12} = 0.60$ | $nd_7 = 1.58144$ | $\upsilon d_7 = 40.89$ |
| $r_{13} = 8.0613$ | $d_{13} = 0.98$ | | |
| $r_{14} = 12.4045$ | $d_{14} = 3.20$ | $nd_8 = 1.49700$ | $\upsilon d_8 = 81.54$ |
| $r_{15} = -14.8783$ | $d_{15} = 1.00$ (wide angle edge) to 8.02 (telephoto edge) | | |
| $r_{16} = \infty$ | | | |
| $d_{16} = 1.50$ | | $nd_9 = 1.51633$ | $\upsilon d_9 = 64.14$ |
| $r_{17} = \infty$ | | | |
| $d_{17} = 6.48$ | | | |
| $r_{18} = \infty$ (imaging plane) | | | |

Constant of cone (κ) and Aspheric coefficients (A, B, C, D)

(Eighth plane)

$\kappa = -0.69869$,
$A = -5.45138 \times 10^{-5}$, $B = 1.65936 \times 10^{-7}$,
$C = 7.04899 \times 10^{-9}$, $D = -2.45380 \times 10^{-10}$
(Ninth plane)

Figure 5:
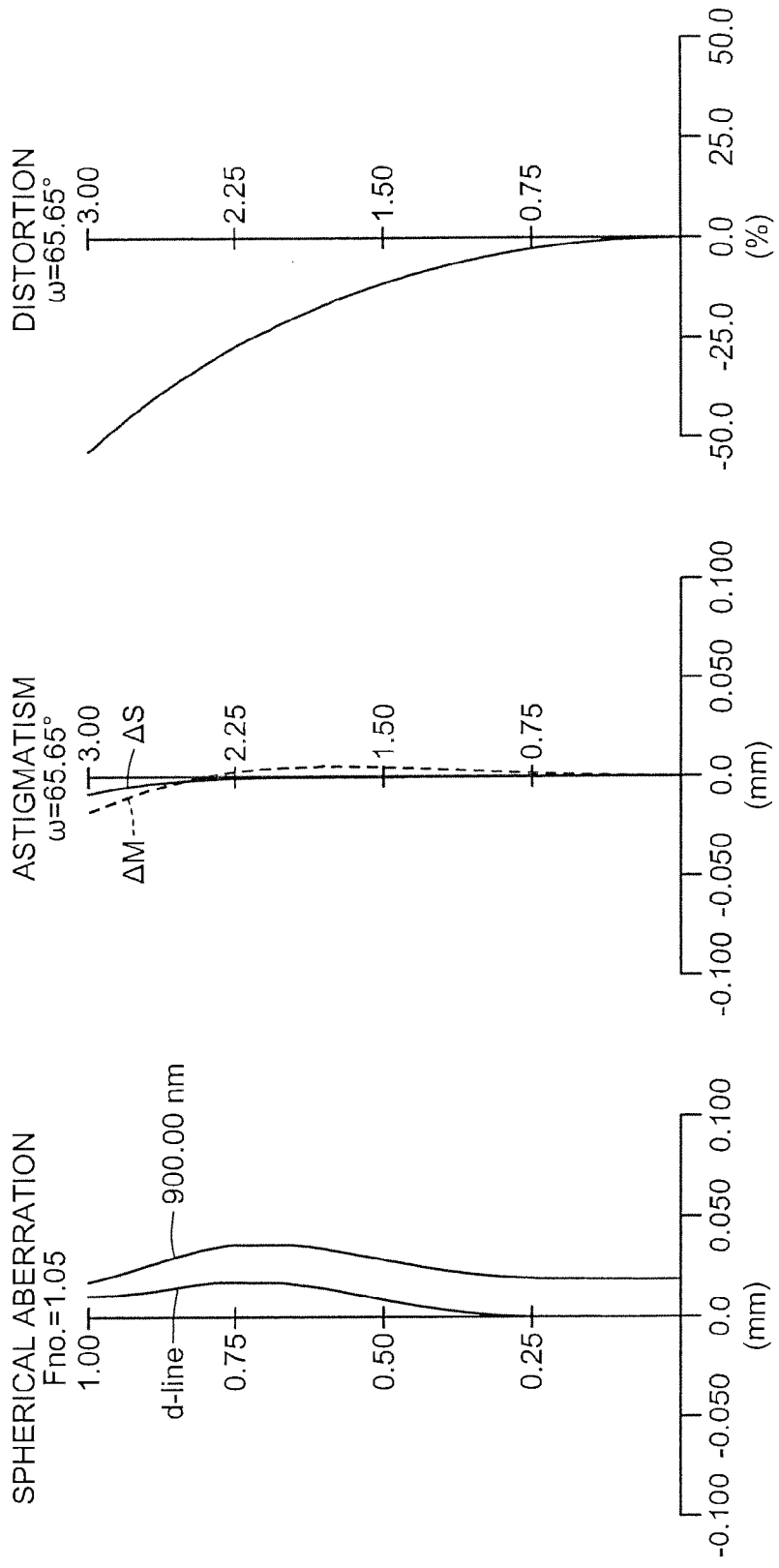
FIG. 5 is a diagram of various types of aberration at the wide angle edge of the zoom lens according to the second example.
Figure 6:
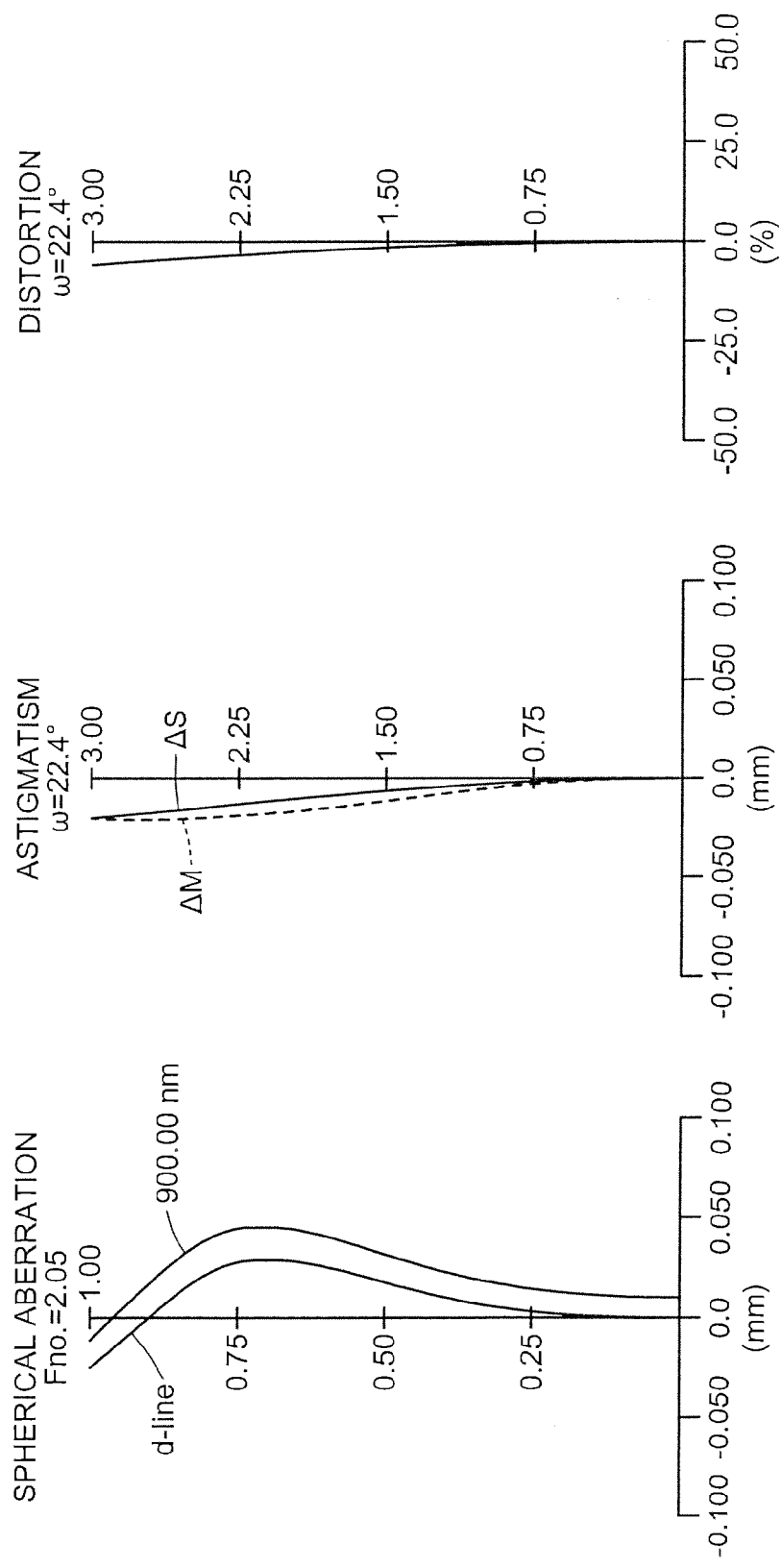
FIG. 6 is a diagram of various types of aberration at the telephoto edge of the zoom lens according to the second example.

$\kappa = -5.08801$,
$A = 8.84663 \times 10^{-5}$, $B = 1.65583 \times 10^{-9}$,
$C = -1.20949 \times 10^{-8}$, $D = -8.26917 \times 10^{-12}$ FIG. 5 is a diagram of various types of aberration at the wide angle edge of the zoom lens according to the second example; FIG. 6 is a diagram of various types of aberration at the telephoto edge of the zoom lens according to the second example. In the diagrams, d-line indicates aberration for a wavelength equivalent to 587.56 nm; and ΔS and ΔM in a portion depicting astigmatism, indicate aberration with respect to a sagittal image plane and a meridional image plane, respectively.

Figure 7:
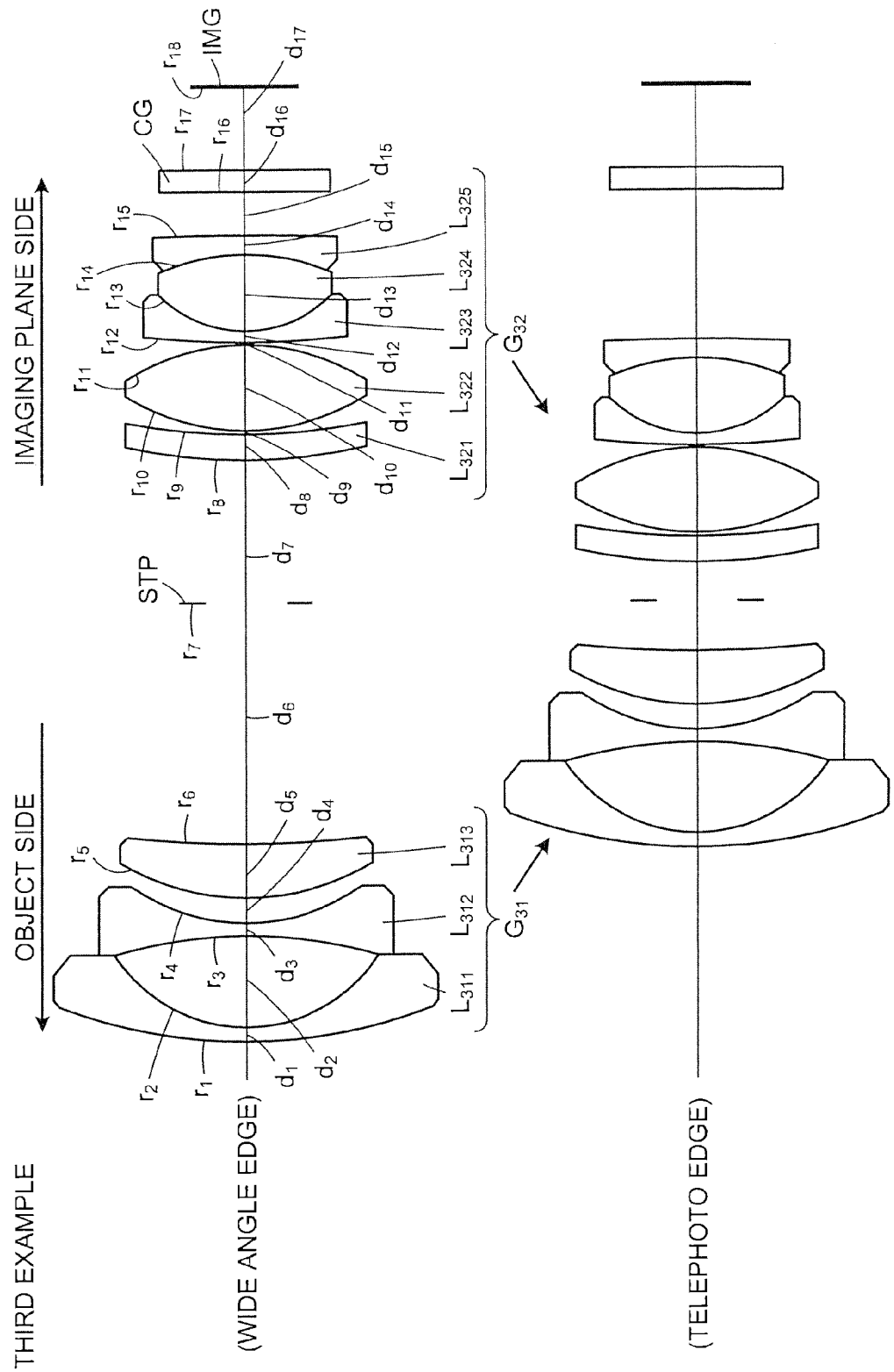
FIG. 7 depicts a cross-sectional view (along the optical axis) of the zoom lens according to a third example.

FIG. 7 depicts a cross-sectional view (along the optical axis) of the zoom lens according to a third example. The zoom lens includes sequentially from the object (non-depicted) side, a first lens group $G_{31}$ having a negative refractive power, a diaphragm STP, and a second lens group $G_{32}$ having a positive refractive power. Between the second lens group $G_{32}$ and the imaging plane IMG, a cover glass CG of an imaging element is disposed. The cover glass CG is disposed as needed and may be omitted when not necessary. Further, at the imaging plane IMG, the light receiving surface of the imaging element, e.g., CCD and CMOS, is disposed.

The first lens group $G_{31}$ includes sequentially from the object side, a first lens $L_{311}$, a second lens $L_{312}$, and a third lens $L_{313}$. The first lens $L_{311}$ is a negative meniscus lens having a convex surface facing toward the object side. The second lens $L_{312}$ is a negative biconcave lens. The third lens $L_{313}$ is a positive lens.

The second lens group $G_{32}$ includes sequentially from the object side, a first lens $L_{321}$, a second lens $L_{322}$, a third lens $L_{323}$, a fourth lens $L_{324}$, and a fifth lens $L_{325}$. The first lens $L_{321}$ is a positive lens, both surfaces of which are aspheric. The second lens $L_{322}$ is a positive lens. The third lens $L_{323}$ is a negative lens. The fourth lens $L_{324}$ is a positive lens. The fifth lens $L_{325}$ is a negative lens. Further, the third lens $L_{323}$, the fourth lens $L_{324}$, and the fifth lens $L_{325}$ are cemented.

The zoom lens zooms from a wide angle edge to a telephoto edge by moving the second lens group $G_{32}$ along the optical axis, toward the object side; and corrects imaging plane (image location) variations accompanying zoom, by moving the first lens group $G_{31}$ along the optical axis.

Various values related to the zoom lens according to the third example are indicated below.

Focal length of entire zoom lens = 2.92 mm (wide angle edge) to 7.70 mm (telephoto edge)
F number = 1.25 (wide angle edge) to 2.00 (telephoto edge)
Angle of view (2ω) = 131.9° (wide angle edge) to 45.3° (telephoto edge)
Zoom ratio = 2.637
(Values related to conditional expression (1))

Abbe number for d-line in positive lens (fourth lens $L_{324}$) in second lens group $G_{32}$ ($\upsilon d_2 p$) = 81.54
(Values related to conditional expression (2))

Abbe number for d-line in first lens $L_{321}$ in second lens group $G_{32}$ ($\upsilon d_{21}$) = 64.14
(Values related to conditional expression (3))

Abbe number for d-line in third lens $L_{313}$ in first lens group $G_{31}$ ($\upsilon d_{13}$) = 17.98

| | | | |
|---|---|---|---|
| $r_1 = 31.6469$ | $d_1 = 0.90$ | $nd_1 = 1.91082$ | $\upsilon d_1 = 35.25$ |
| $r_2 = 7.5052$ | $d_2 = 5.65$ | | |
| $r_3 = -34.3950$ | $d_3 = 0.70$ | $nd_2 = 1.77250$ | $\upsilon d_2 = 49.60$ |
| $r_4 = 20.4938$ | $d_4 = 0.52$ | | |
| $r_5 = 17.2958$ | $d_5 = 3.00$ | $nd_3 = 1.94594$ | $\upsilon d_3 = 17.98$ |
| $r_6 = 83.2280$ | $d_6 = 21.56$ (wide angle edge) to 5.61 (telephoto edge) | | |
| $r_7 = \infty$ (aperture stop) | $d_7 = 7.61$ (wide angle edge) to 1.20 (telephoto edge) | | |
| $r_8 = 20.1615$ (aspheric surface) | $d_8 = 2.00$ | $nd_4 = 1.51633$ | $\upsilon d_4 = 64.14$ |
| $r_9 = 43.7725$ (aspheric surface) | $d_9 = 0.10$ | | |
| $r_{10} = 14.6203$ | $d_{10} = 5.00$ | $nd_5 = 1.49700$ | $\upsilon d_5 = 81.54$ |
| $r_{11} = -12.6697$ | $d_{11} = 0.10$ | | |
| $r_{12} = 34.6943$ | $d_{12} = 0.70$ | $nd_6 = 1.58144$ | $\upsilon d_6 = 40.75$ |
| $r_{13} = 7.5000$ | $d_{13} = 5.00$ | $nd_7 = 1.49700$ | $\upsilon d_7 = 81.54$ |
| $r_{14} = -9.9213$ | $d_{14} = 0.60$ | $nd_8 = 1.60342$ | $\upsilon d_8 = 38.03$ |
| $r_{15} = -50.0000$ | $d_{15} = 1.00$ (wide angle edge) to 7.47 (telephoto edge) | | |
| $r_{16} = \infty$ | $d_{16} = 1.50$ | $nd_9 = 1.51633$ | $\upsilon d_9 = 64.14$ |
| $r_{17} = \infty$ | $d_{17} = 7.34$ | | |
| $r_{18} = \infty$ (imaging plane) | | | |

Constant of cone (κ) and Aspheric coefficients (A, B, C, D)

(Eighth plane)

$\kappa = 2.99620$,
$A = 1.59511 \times 10^{-5}$, $B = -4.71441 \times 10^{-6}$,
$C = -1.68105 \times 10^{-7}$, $D = 2.54682 \times 10^{-9}$
(Ninth plane)

Figure 8:
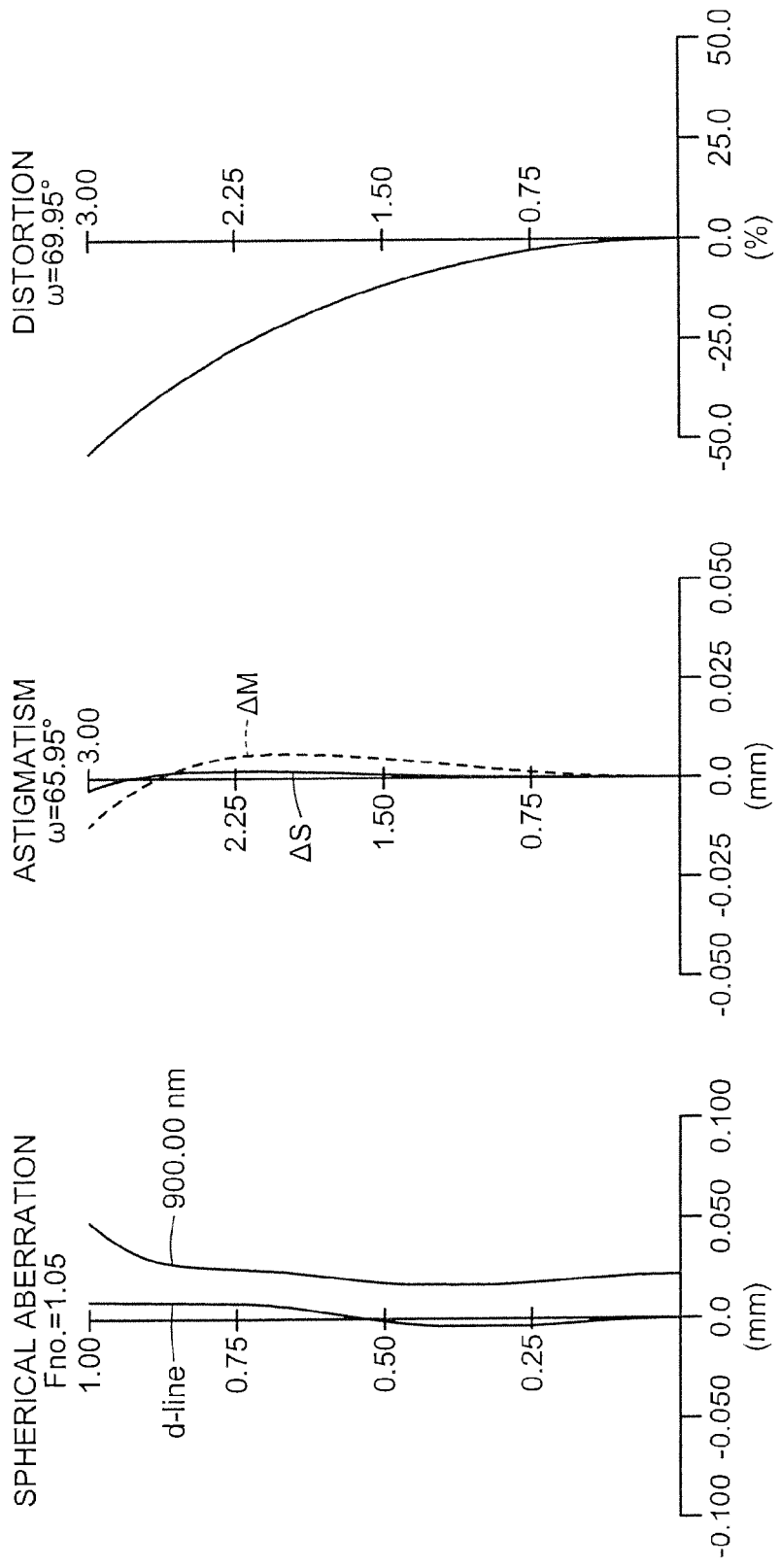
FIG. 8 is a diagram of various types of aberration at the wide angle edge of the zoom lens according to the third example.
Figure 9:
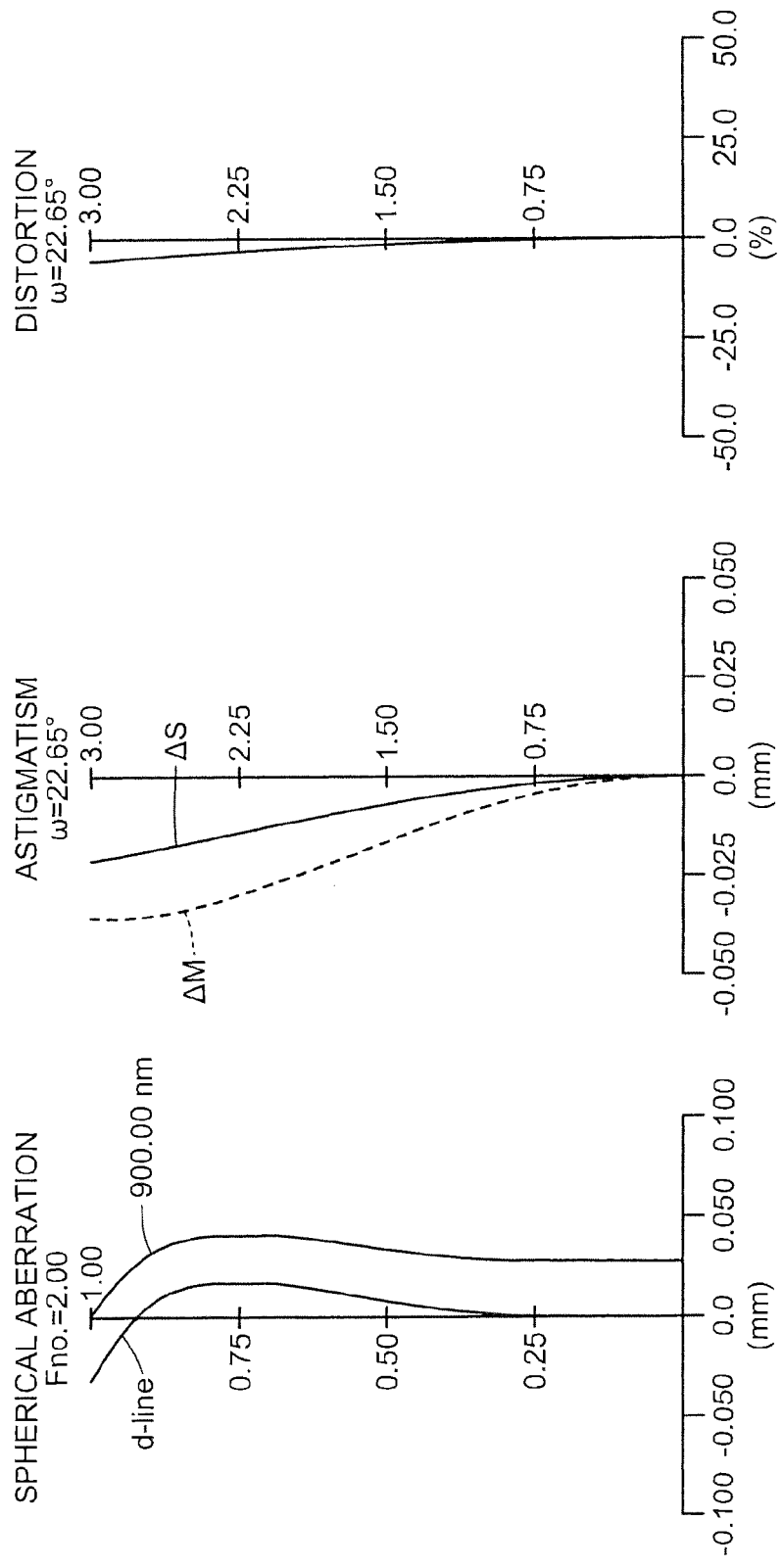
FIG. 9 is a diagram of various types of aberration at the telephoto edge of the zoom lens according to the third example.

$\kappa = 31.33464$,
$A = 2.67464 \times 10^{-4}$, $B = -4.21694 \times 10^{-6}$,
$C = -1.43490 \times 10^{-7}$, $D = 2.54116 \times 10^{-9}$ FIG. 8 is a diagram of various types of aberration at the wide angle edge of the zoom lens according to the third example; FIG. 9 is a diagram of various types of aberration at the telephoto edge of the zoom lens according to the third example. In the diagrams, d-line indicates aberration for a wavelength equivalent to 587.56 nm; and ΔS and ΔM in a portion depicting astigmatism, indicate aberration with respect to a sagittal image plane and a meridional image plane, respectively.

Among the values for each of the examples above, $r_1$, $r_2$, ... indicate radii of curvature for each lens, aperture stop surface, etc.; $d_1$, $d_2$, ... indicate the thickness of the lenses, aperture stop, etc. or the distance between surfaces thereof;

$nd_1$, $nd_2$, ... indicates the refraction index of each lens with respect to the d-line ($\lambda$=587.56 nm); and $\upsilon d_1$, $\upsilon d_2$, ... indicates the Abbe number with respect to the d-line ($\lambda$=587.56 nm) of each lens.

Each of the aspheric surfaces above can be expressed by equation [1], where Z is the distance along a direction of the optical axis from the apex of the lens surface, y is the height in a direction normal to the optical axis, and the travel direction of light is positive.

$$Z = \frac{y^2}{R(1 + \sqrt{1 - (1+K)y/R^2})^2} + Ay^4 + By^6 + Cy^8 + Dy^{10} \quad [1]$$

Where, R is paraxial radii of curvature; K is constant of the cone; and A, B, C, D are the fourth, sixth, eighth, and tenth aspheric coefficients, respectively.

As described above, the zoom lens according to each of the examples above satisfies each of the conditional expressions, whereby the zoom lens has high optical performance in terms of high zoom ratio, high focal ratio, and megapixelation. In other words, over the entire zoom range, various types of aberration occurring with light in the visible range to the near-infrared range can be favorably corrected. Furthermore, the zoom lens according to each example employs a lens having an appropriately shape aspheric surface, whereby favorable optical performance can be maintained with fewer lenses.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A zoom lens comprising sequentially from an object side:
   a first lens group having a negative refractive power;
   a diaphragm; and
   a second lens group having a positive refractive power, wherein
   zoom from a wide angle edge to a telephoto edge is performed by displacement of the second lens group along an optical axis, toward the object side,
   correction of imaging plane variation accompanying the zoom, is performed by displacement of the first lens group along the optical axis,
   the second lens group includes a positive first lens disposed farthest on the object side and having at least one aspheric surface, and a cemented lens that includes a negative lens, a positive lens, and a negative lens, and
   a first condition $\upsilon d_2 p > 75$ is satisfied, $\upsilon d_2 p$ being the Abbe number for a d-line in the positive lens included in the cemented lens of the second lens group.

2. The zoom lens according to claim 1, wherein
   a second condition $\upsilon d_{21} > 63$ is satisfied, $\upsilon d_{21}$ being the Abbe number for a d-line in the first lens of the second lens group.

3. The zoom lens according to claim 1, wherein
   the first lens group includes sequentially from the object side, 3 lenses constituting 3 groups, including:
   a first lens that is a negative meniscus lens having a convex surface facing toward the object side,
   a second lens that is a negative biconcave lens, and
   a positive third lens, and
   a third conditional expression $\upsilon d_{13} < 20$ is satisfied, $\upsilon d_{13}$ being the Abbe number for a d-line in the positive third lens of the first lens group.

* * * * *